US012370454B2

(12) United States Patent
Hirakawa et al.

(10) Patent No.: US 12,370,454 B2
(45) Date of Patent: *Jul. 29, 2025

(54) USER OPTIONS IN MODIFYING FACE OF COMPUTER SIMULATION CHARACTER

(71) Applicant: Sony Interactive Entertainment Inc., Tokyo (JP)

(72) Inventors: Ken Yoshihiko Hirakawa, San Mateo, CA (US); Keisuke Saito, San Mateo, CA (US); Daniel Morales, San Mateo, CA (US); Dilip Krishnamoorthi, San Mateo, CA (US); Keith D. Brown, San Mateo, CA (US); Takuya Kawasaki, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,926

(22) Filed: Apr. 2, 2024

(65) Prior Publication Data

US 2024/0342616 A1     Oct. 17, 2024

Related U.S. Application Data

(63) Continuation of application No. 17/571,435, filed on Jan. 7, 2022, now Pat. No. 11,944,907.

(51) Int. Cl.
*A63F 13/79* (2014.01)
*A63F 13/55* (2014.01)
*A63F 13/63* (2014.01)
*A63F 13/65* (2014.01)

(52) U.S. Cl.
CPC .............. *A63F 13/79* (2014.09); *A63F 13/55* (2014.09); *A63F 13/63* (2014.09); *A63F 13/65* (2014.09); *A63F 2300/5553* (2013.01)

(58) Field of Classification Search
None
See application file for complete search history.

(56) References Cited

U.S. PATENT DOCUMENTS

| | | | |
|---|---|---|---|
| 6,350,199 B1 | 2/2002 | Williams et al. | |
| 10,228,760 B1* | 3/2019 | Ross | A63F 13/211 |
| 2003/0013529 A1* | 1/2003 | Miura | A63F 13/335 |
| | | | 463/42 |
| 2003/0100363 A1 | 5/2003 | Ali | |
| 2004/0180708 A1* | 9/2004 | Southard | A63F 13/335 |
| | | | 463/1 |

(Continued)

*Primary Examiner* — Jason T Yen
(74) *Attorney, Agent, or Firm* — Fish & Richardson P.C.

(57) ABSTRACT

A technique presents on a display a computer game character and a first scannable code (SC) scannable by a camera of at least a first user apparatus to cause a server to download to the first user apparatus a photo app operable to generate a photo of a first user and send the photo to the server, which alters the character in accordance with the photo. The character with the face altered is presented along with a second SC that can be scanned to cause the server to download to the first user apparatus a share app operable to select a second user apparatus to send an image of the character with the face altered in accordance with the photo such that the second user apparatus can display the character with the face altered in accordance with the photo. User options may be provided to alter the character or game.

18 Claims, 9 Drawing Sheets

(56) References Cited

U.S. PATENT DOCUMENTS

| | | | |
|---|---|---|---|
| 2005/0026685 A1 | 2/2005 | Ruark et al. | |
| 2010/0050088 A1* | 2/2010 | Neustaedter | G06F 3/0482 |
| | | | 715/745 |
| 2010/0201693 A1* | 8/2010 | Caplette | G10H 1/368 |
| | | | 345/474 |
| 2013/0047099 A1 | 2/2013 | Markman et al. | |
| 2014/0300612 A1* | 10/2014 | Li | A63F 13/79 |
| | | | 345/473 |
| 2016/0287979 A1* | 10/2016 | Akavia | A63H 33/42 |
| 2017/0056775 A1 | 3/2017 | Barber | |
| 2017/0103432 A1 | 4/2017 | Borchetta et al. | |
| 2020/0126316 A1 | 4/2020 | Sharma et al. | |
| 2021/0082018 A1 | 3/2021 | Bull et al. | |
| 2021/0134285 A1* | 5/2021 | Santiago | G10L 15/30 |
| 2021/0362064 A1 | 11/2021 | Eatedali et al. | |
| 2023/0219004 A1 | 7/2023 | Hirakawa et al. | |

\* cited by examiner

USER OPTIONS IN MODIFYING FACE OF COMPUTER SIMULATION CHARACTER

FIELD

The present application relates generally to user options in modifying faces of computer simulation characters such as computer game characters.

BACKGROUND

As recognized herein, morphing a gamer's face onto a computer character can be fun and interesting particularly if provision is made for sharing the fun with friends.

SUMMARY

Accordingly, in one aspect a device includes at least one storage device that is not a transitory signal and that includes instructions executable by at least one processor to cause the processor to present on at least one display at least one computer game having at least a first character. The instructions are executable to present on the display at least a first selector selectable by at least one end user to execute one or more of the following and any and all combinations thereof. The selector may be selectable to:

change native dialog of the computer game associated with the first character to use the end user's name or another name input by the end user;

create a digital image or video file, such as a graphical interchange format (.gif) file or Joint Photographic Experts Group (JPEG) file based on at least part of the computer game;

select a length of a clip of the computer game in which the first character appears, modified according to an image of the end user;

alter an age of the first character;

alter hair of the first character;

alter accessories worn by the first character;

alter a color of the first character;

input voice signals representing the voice of the end user, the voice signals being used to alter native dialog of the computer game such that the dialog is played in the voice of the end user;

input dialog signals to create dialog of the computer game;

input text presented with the video game.

In another aspect, a method includes presenting on at least one display at least one computer game comprising at least a first character and presenting on the display at least one end user-generated alteration of an appearance or voice of the first character.

In another aspect, a device includes at least one processor programmed with instructions to present on at least one display at least one video comprising at least a first character, receive input from at least one input source to change at least a voice of the first character, an appearance of the first character, or a dialog of the first character, or any combination thereof, and present the video in accordance with the input.

The details of the present application, both as to its structure and operation, can be best understood in reference to the accompanying drawings, in which like reference numerals refer to like parts, and in which:

DETAILED DESCRIPTION

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Figure 1:
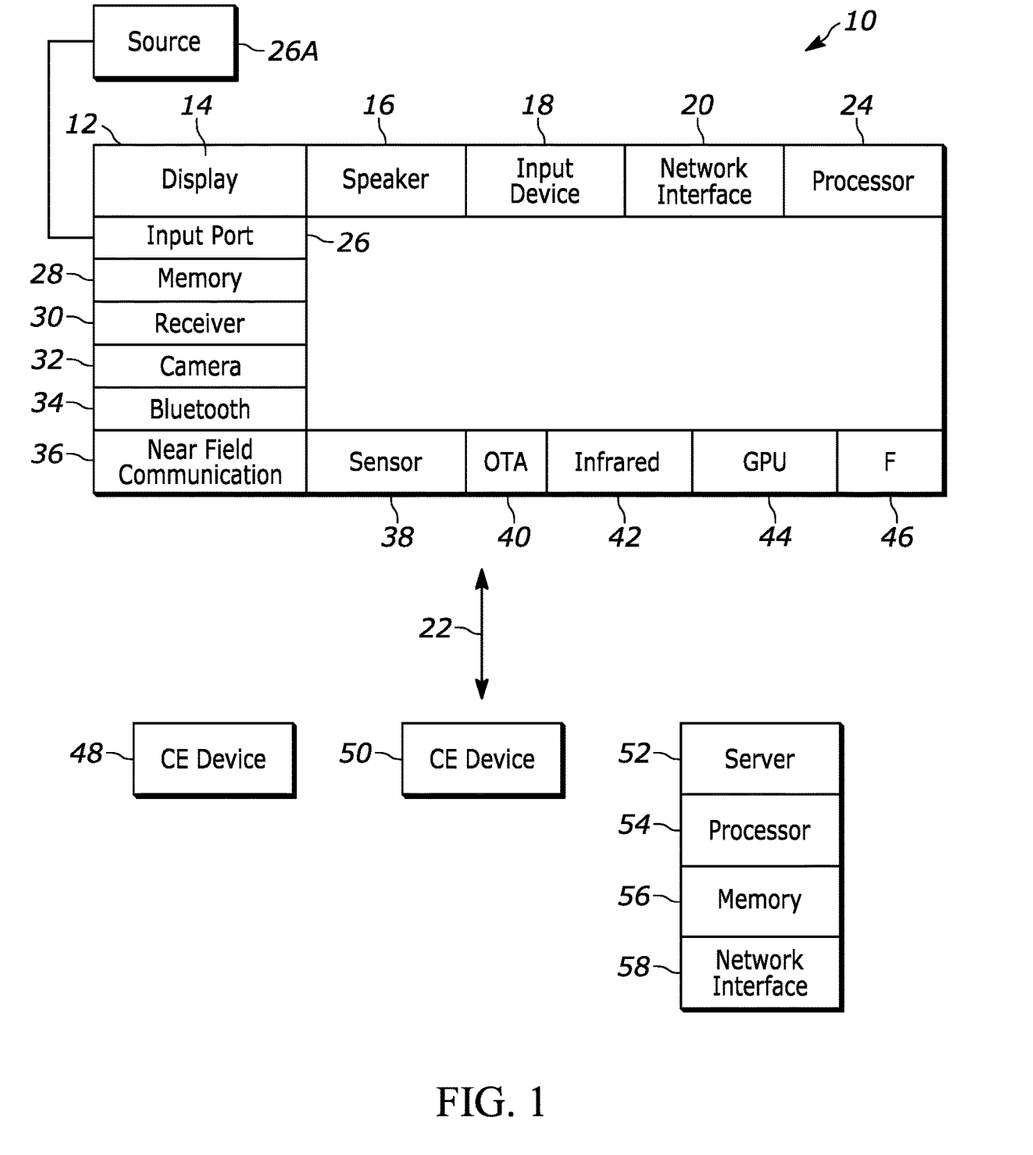
FIG. 1 is a block diagram of an example system in accordance with present principles.

Accordingly, to undertake such principles the AVD 12 can be established by some, or all of the components shown in FIG. 1. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. Any user interfaces (UI) described herein may be consolidated and/or expanded, and UI elements may be mixed and matched between UIs.

Figure 2:
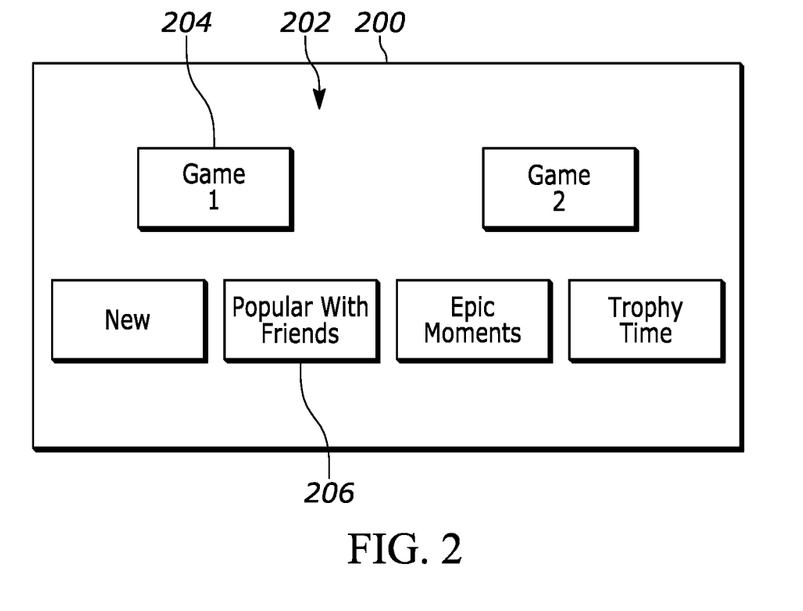
FIG. 2 illustrates a first example screen shot of a display on which a computer simulation is presented consistent with present principles.

FIG. 2 illustrates a display 200 such as any display described herein, e.g., a TV on which video games are presented, presenting a UI 202 under control of a main application ("app") that in the non-limiting example shown includes game windows 204 presenting video or still images from respective computer games. Below the windows 204 are feature windows 206 representing respective categories of games such as "new", "popular with friends", "epic moments" (representing much-repeated or viewed segments of games or representing segments of games the user has "liked"), and "trophy time", representing games or game segments in which the user or other users won prizes.

Figure 3:
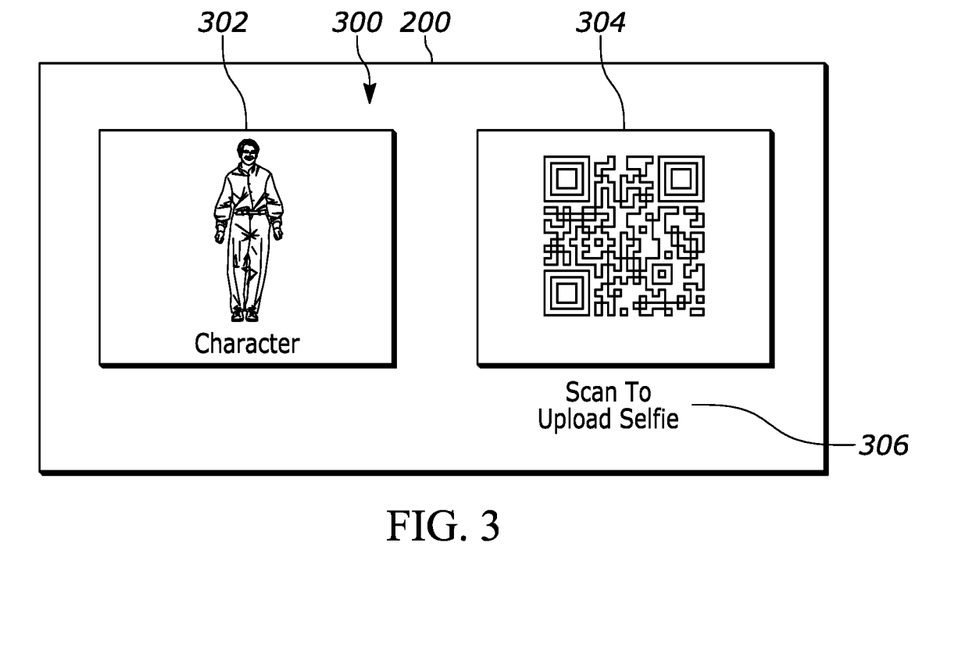
FIG. 3 illustrates a second example screen shot of a display on which the computer simulation is presented consistent with present principles.

Automatically or upon user selection a UI 300 shown in FIG. 3 may be presented on the display 200. In the non-limiting example of FIG. 3, a character window 302 is shown in which a character of a computer game appears in still image or video. The user may select the clip being presented or it may be selected automatically for the user. The user may select the character from the game to be altered it may be selected automatically for the user.

Also, a scannable code (SC) 304 such as a quick response (QR) code or barcode or other code appears that can be scanned by a camera of, e.g., a user apparatus such as a smart phone. A prompt 306 may also appear to prompt the user to scan the code for a specific purpose, in the example shown, to upload a photo ("selfie") of the user for purposes to be shortly described.

Figure 4:
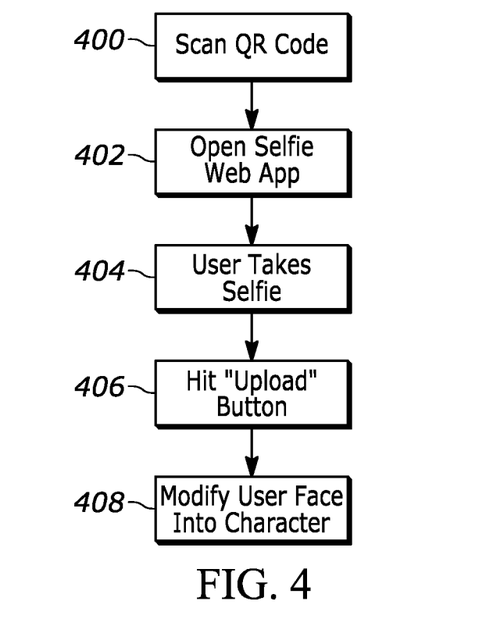
FIG. 4 illustrates example logic in example flow chart format consistent with present principles.

Indeed, and turning now to FIG. 4, at block 400 a user manipulating, e.g., a user apparatus such as a phone operates the camera on the phone to scan the code 304 shown in FIG. 3. This causes the phone to open an application, termed herein a "selfie app", that is a web app for permitting a photo taken by the user of himself at block 404 to be uploaded to a server such as the server 52 shown in FIG. 1 when the user selects at block 406 an "upload" button on his phone presented by the selfie app. Scanning the code essentially invokes a uniform resource listing (URL) of a hypertext transfer protocol (HTTP) web page hosted by the cell phone, the server, or a combination of the two.

The server receives the image of the user and at block 408 alters the face and if desired the body of the character shown at 302 in FIG. 3 in accordance with the image of the user. In other embodiments the user apparatus alters the face and if desired the body of the character. In other embodiments the server cooperates with the user apparatus to alter the face and/or body. In some embodiments the user may provide input to decide on whether the game or clip is to be presented in low- or high-quality video and thus take less or more time, respectively, to modify with the user's face.

In a non-limiting example, a Python script known as "Faceswap" may be used in which a library takes source video and merges the selfie onto a face in the video.

In non-limiting examples the image of the user may be blended with that of the game character. Blending may be accomplished using any appropriate bending algorithm. For example, blending the user and character images may be done using bitmaps and averaging corresponding bits to produce an average image, or using layer masks, or using alpha blending, in which a composite of two images is derived from combining pixel color values based on pixel transparency (alpha) values, typically on a pixel-by-pixel basis, etc. Blending may be of facial features only or it may be done by blending a full body image of the user with a full body image of the character.

Figure 5:
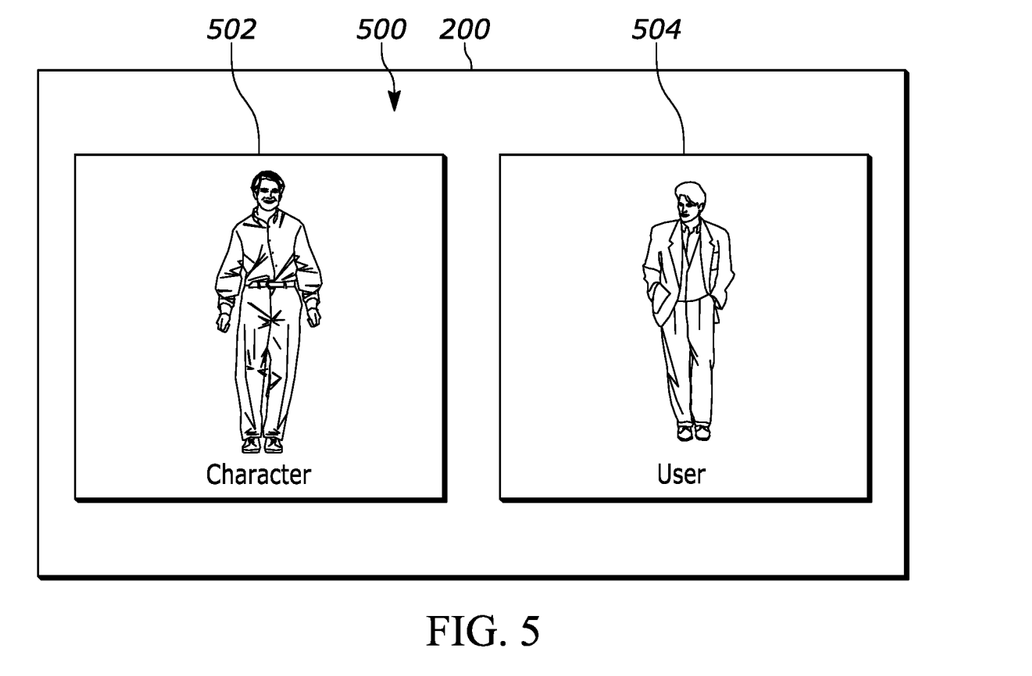
FIG. 5 illustrates a third example screen shot of a display on which the computer simulation is presented consistent with present principles.
Figure 6:
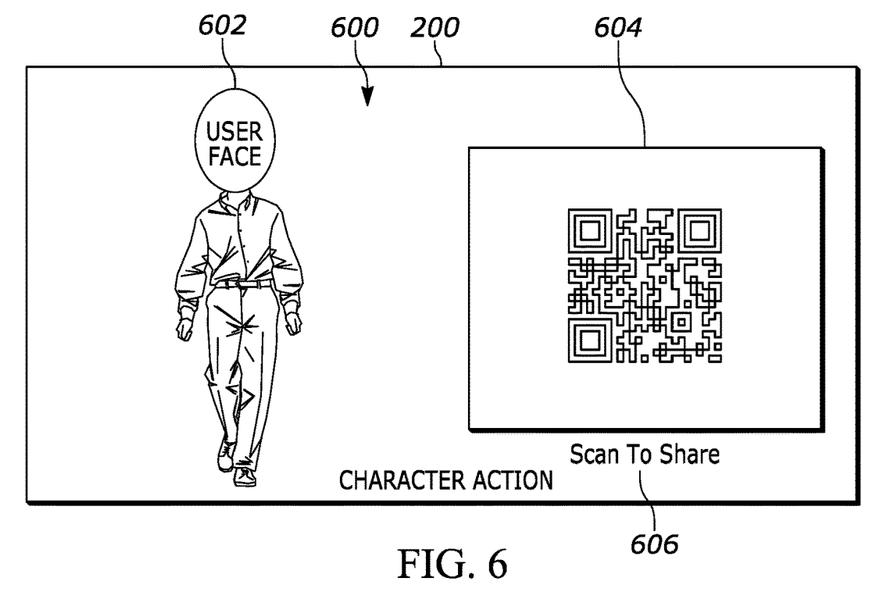
FIG. 6 illustrates a fourth example screen shot of a display on which the computer simulation is presented consistent with present principles.

FIG. 5 illustrates a UI 500 that may be presented on the display 200 in which a still or video image 502 of the game character appears side by side with an image 504 of the user as uploaded to the server at block 406 in FIG. 4. Then after the operation at block 408 in FIG. 4 a UI 600 may be presented on the display 200 showing an altered game character 602 that is altered in accordance with the user's image such that at least the face of the character 602 is based on the image of the user. The game can execute with the character 602 moving according to the game program under control of a game controller except that the face of the character appears to be that of the user.

The UI 600 may also present a second code 604 that can be scanned to share an image or images of the game character 602 altered in accordance with the image of the user. A prompt 606 may be presented to this effect.

Figure 7:
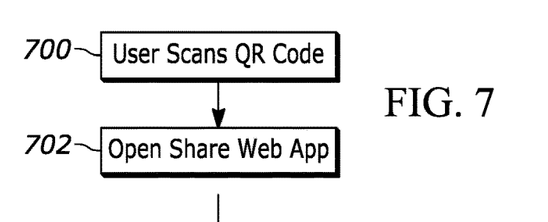
FIG. 7 illustrates additional example logic in example flow chart format consistent with present principles.

Accordingly, at block 700 in FIG. 7 a user may manipulate his apparatus such as a phone to scan the code 604 shown in FIG. 6. This causes, at block 702, the user apparatus to open a share app shown in FIG. 8.

Figure 8:
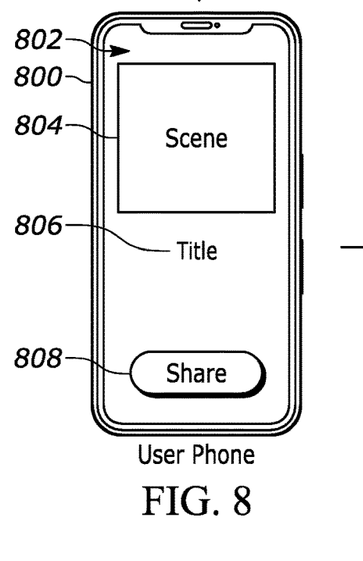
FIG. 8 illustrates a first example screen shot of the gamer's cell phone.
Figure 9:
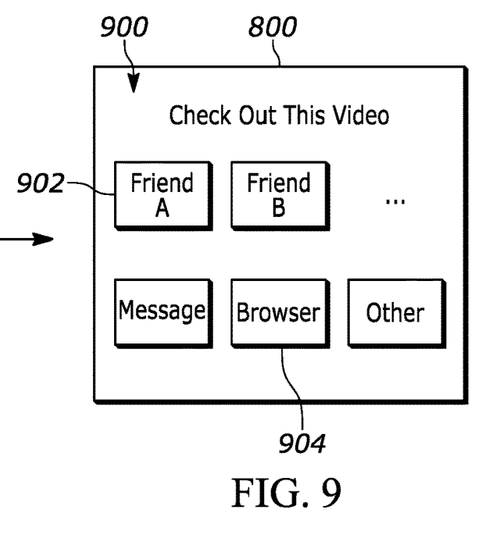
FIG. 9 illustrates a second example screen shot of the gamer's cell phone.

More specifically, FIG. 8 illustrates a user apparatus 800 that has scanned the code 604 in FIG. 6 and as a result has presented a UI 802 in accordance with the share app. The UI 802 presents a scene 804 from the computer game along with the title 806 of the game and a share selector 808. Selection of the share selector 808 may cause a UI 900 shown in FIG. 9 to appear on the user apparatus 800. The UI 900 may include a prompt 902 to check out a video under which may be selectors 904 each selectable to select a recipient such as a friend from a friends list stored in the apparatus 800. A transmission mode selector 906 may be selected to designate the mode of transmission to the friend selected using a selector 904. Transmission modes without limitation may include, e.g., instant message or other type of telephony messaging, transmission through a Web browser, etc.

Figure 10:
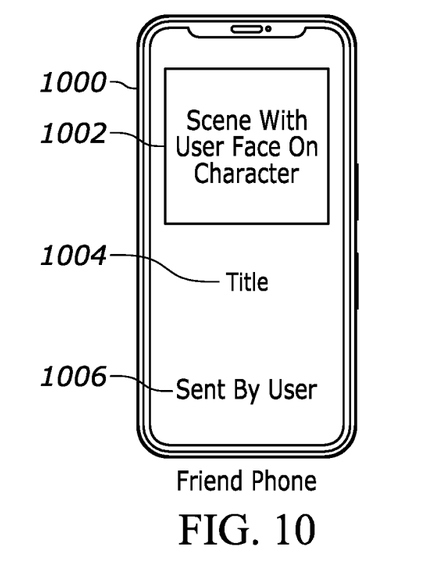
FIG. 10 illustrates an example screen shot of a selected friend's cell phone.

Once the user selects the recipient(s) and transmission mode, the recipient's network address or email address or phone number as appropriate for the selected transmission mode is accessed and data sent to an apparatus 1000 associated with the recipient and shown in FIG. 10. The recipient apparatus 1000 presents a scene 1002 of the computer game showing the game character altered in accordance with the user's image as shown at 602 in FIG. 6. The title 1004 of the game and/or character may be presented along with the name 1006 of the sending user.

Figure 11:
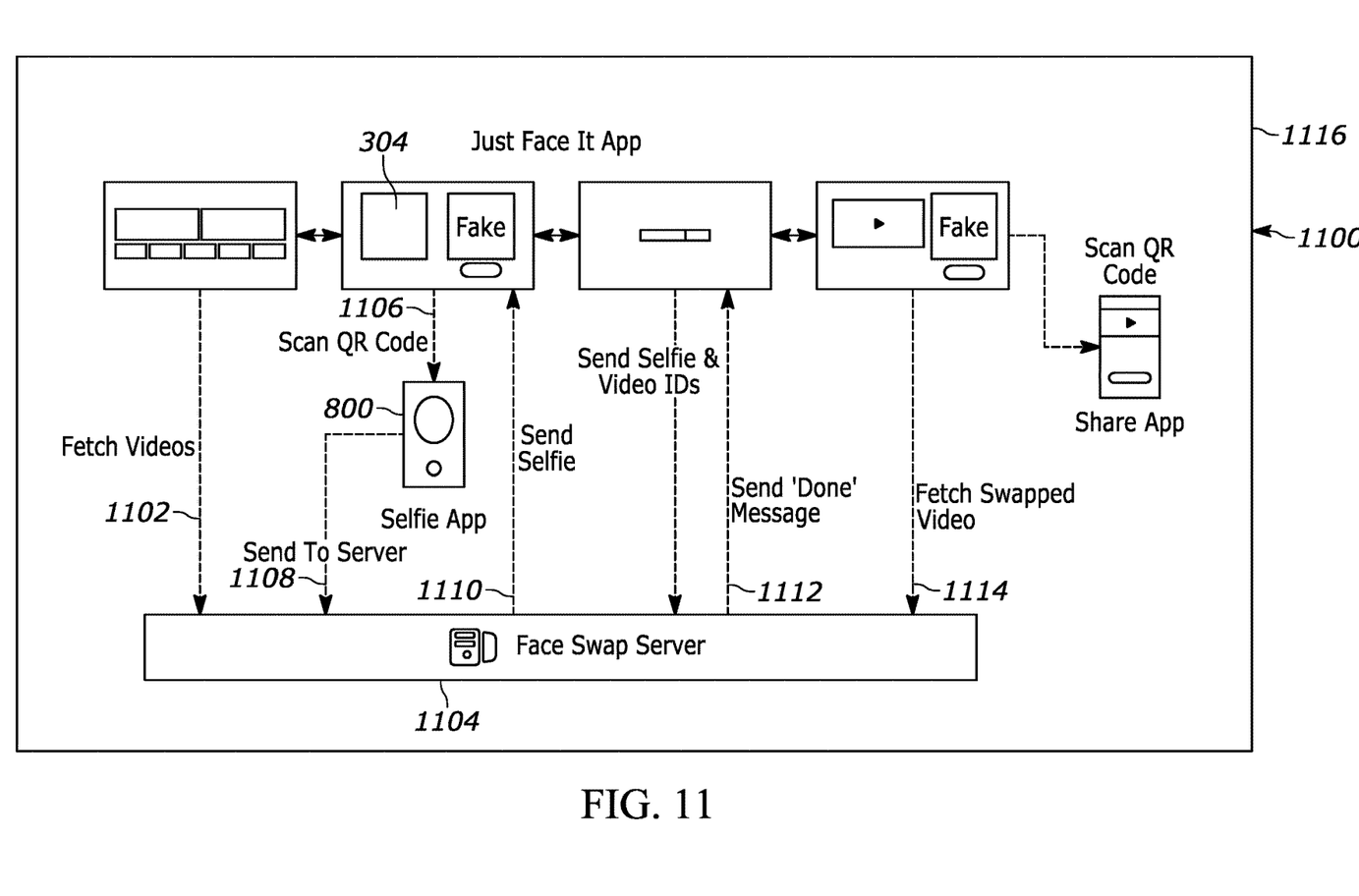
FIG. 11 illustrates overall processing of an example technique.

FIG. 11 encapsulates the technique discussed above. The main app 1100 fetches videos at 1102 from a server 1104 such as the server 52 shown in FIG. 1. The game video or videos may be presented on the display 200 shown in FIG. 2 and described above. The user employs his apparatus 800 to scan the first code 304 as shown at 1106 to execute the selfie app, which sends the image of the user to the server as indicated at 1108.

In response, as indicated at 1110 the server sends the image to the display 200 for presentation. The user image and IDs of the game video whose character is being altered are exchanged between the server and display as indicated by the arrows 1112. The display consequently fetches the altered video that includes the character altered according to the user image as indicated at 1114 and presents the second code 604, which is scanned by the user apparatus 800 to invoke the share app as indicated by the arrow 1116.

The techniques described above may be performed in real time or non-real time. Text as input by the user and voice as spoken by the user and picked up using a microphone may be morphed onto the game character as well as set forth further below.

Figure 12:
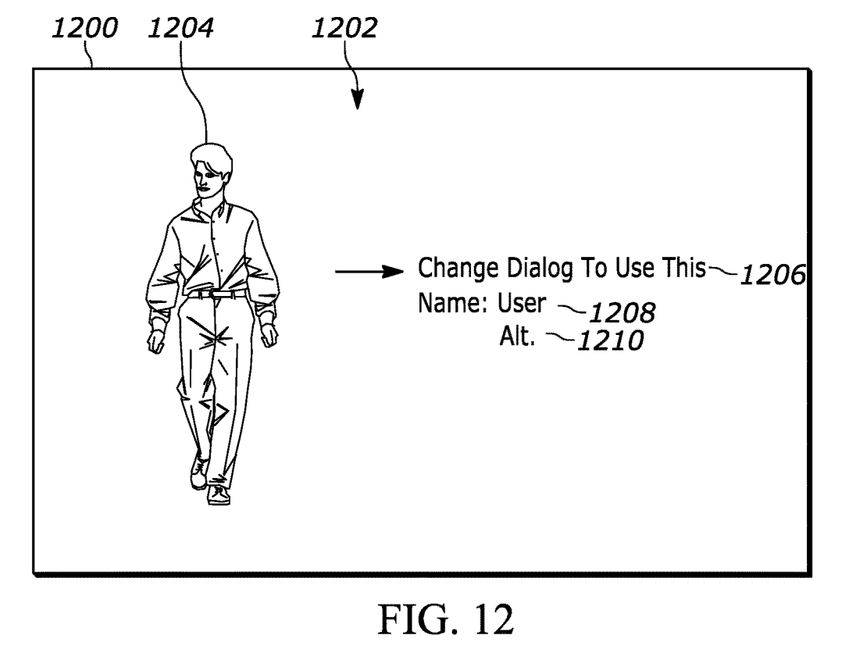
FIGS. 12-17 are screen shots of example user interfaces (UI) that can be used to further personalize a simulation.

FIG. 12 illustrates a display 1200 such as any display herein including, e.g., the display of the user apparatus on which a UI 1202 can be presented. In the non-limiting example shown, the UI includes an image 1204 of a game character either as provided by the game designer or as modified consistent with disclosure above to have the face of the user.

A prompt 1206 may be presented to allow the user to change native dialog of the game associated with the character 1204 to use the user's name (by selecting selector 1208) or another fanciful name input by the user (by selecting selector/input field 1210). Thereafter, as the game and/or selected clip of the game is presented, the dialog played on audio speakers is changed such that whenever the native name of the character 204 is to be uttered, the name selected by the user is played instead.

Figure 13:
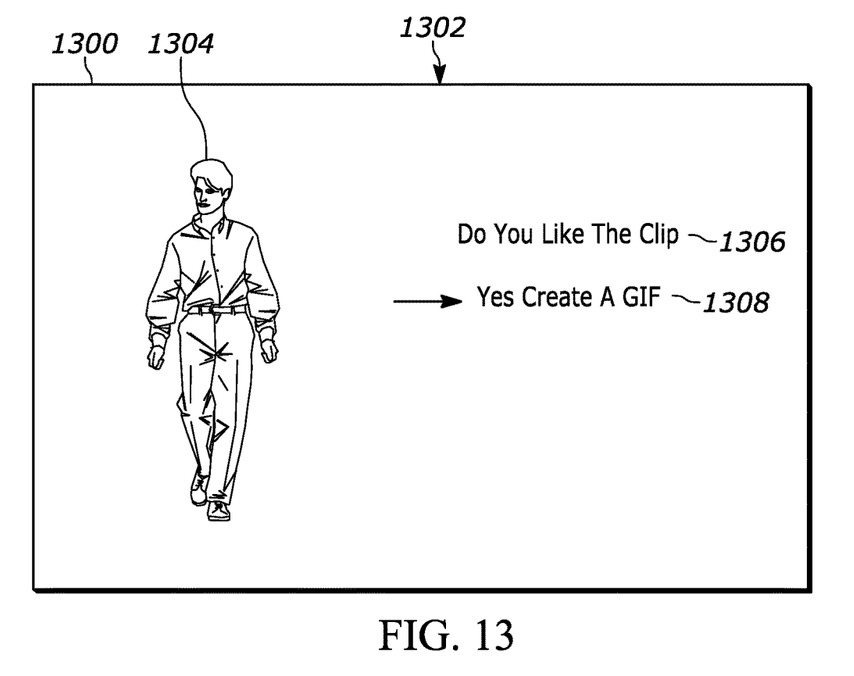

FIG. 13 illustrates a display 1300 such as any display herein including, e.g., the display of the user apparatus on which a UI 1302 can be presented. In the non-limiting example shown, the UI includes an image 1304 of a game character either as provided by the game designer or as modified consistent with disclosure above to have the face of the user.

A prompt 1306 may be presented to allow the user to create a digital image or video file, such as a graphical interchange format (.gif) file or Joint Photographic Experts Group (JPEG) file by, e.g., selecting a selector 1308. In response, the clip is converted to an image file in the appropriate format.

Figure 14:
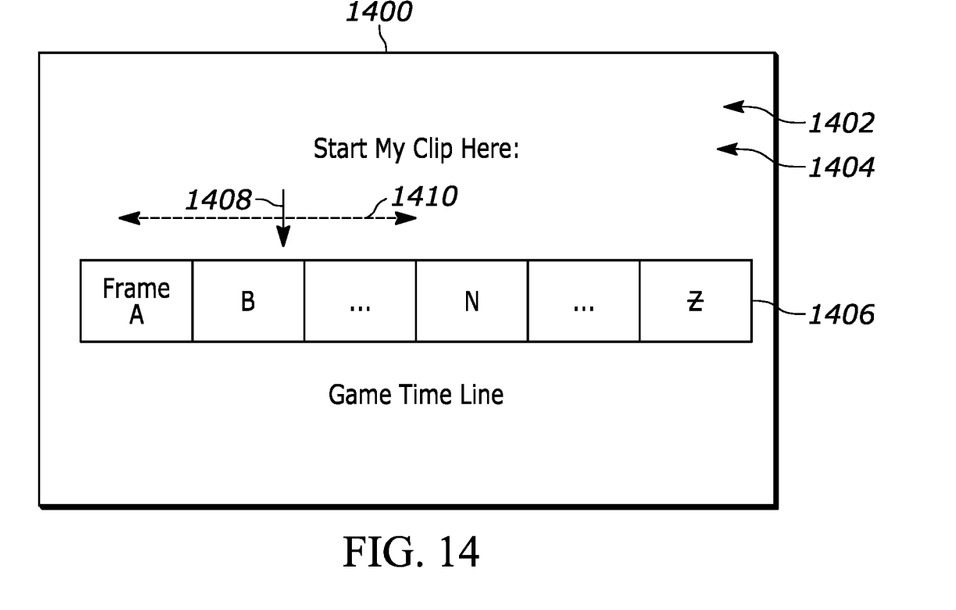

FIG. 14 illustrates a display 1400 such as any display herein including, e.g., the display of the user apparatus on which a UI 1402 can be presented. In the non-limiting example shown, the UI includes an image 1404 of a game timeline, from start (on the left) to finish (on the right) with plural frames 1406 in the timeline at the times they appear in the game when played as a video. A slider 1408 may be provided and can be moved left and right along the timeline as indicated by the dashed arrows 1410 to select a frame 1406 at which to start the clip discussed in FIGS. 1-11 above. A stop frame also can be selected to select the end of the clip.

Figure 15:
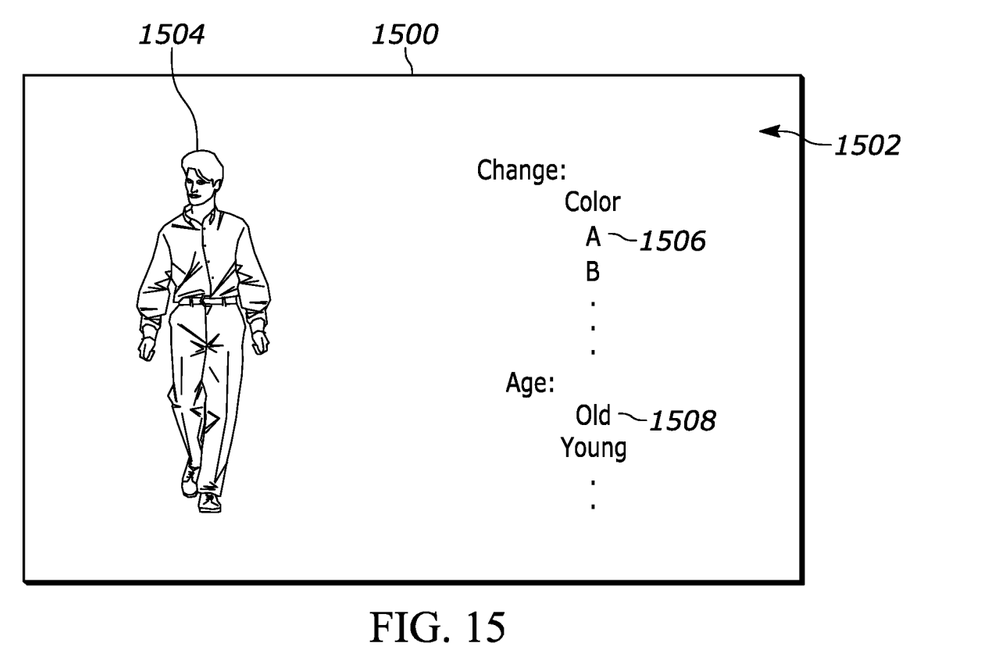

FIG. 15 illustrates that a palette can be provided to allow the end user to change visual attributes of the face of the character.

With more specificity, FIG. 15 illustrates a display 1500 such as any display herein including, e.g., the display of the user apparatus on which a UI 1502 can be presented. In the non-limiting example shown, the UI includes an image 1504 of a game character either as provided by the game designer or as modified consistent with disclosure above to have the face of the user.

Color selectors 1506 may be provided that can be selected by the user to define the color of the face of the character 1504. Age selectors 1508 may be provided that can be selected by the user to define the age of the face of the character 1504 (with more wrinkle lines indicating older age, etc., such that a first number of wrinkle lines is imposed on the face when a younger age is selected and a second number of wrinkle lines greater than the first number is imposed on the face when an older age is selected.)

Figure 16:
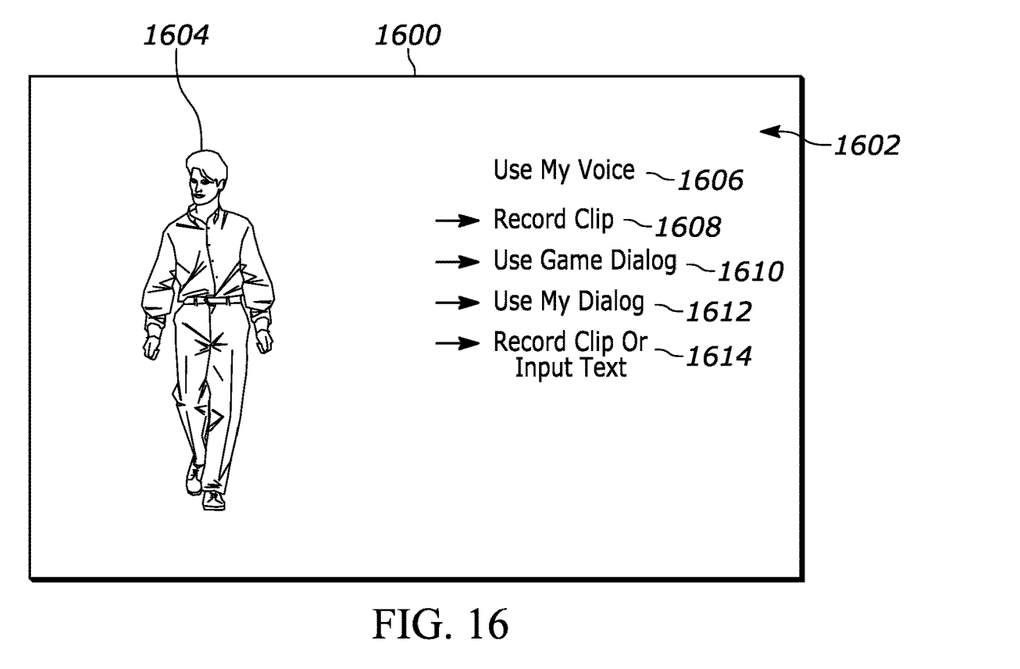

FIG. 16 illustrates a display 1600 such as any display herein including, e.g., the display of the user apparatus on which a UI 1602 can be presented. In the non-limiting example shown, the UI includes an image 1604 of a game character either as provided by the game designer or as modified consistent with disclosure above to have the face of the user.

The UI 1602 may include a selector 1606 selectable to allow a user to dub the user's voice onto dialog to be spoken by the character. The user may record a clip of his voice as indicated at 1608 by means of, e.g., a microphone on the user apparatus. The voice characteristics of the recorded voice are used to modify the voice of the character 1604.

Also, if desired the user may select a selector 1610 to have the character 1604 speak the game dialog native to the game, but in the user's voice if desired, or a selector 1612 to have the character 1604 speak a dialog created by the user by selecting at 1614 either to dictate the desired dialog into a microphone of the user apparatus, or to input text at 1616 that is converted to speech and used for the dialog of the character 1604 or other character.

Figure 17:
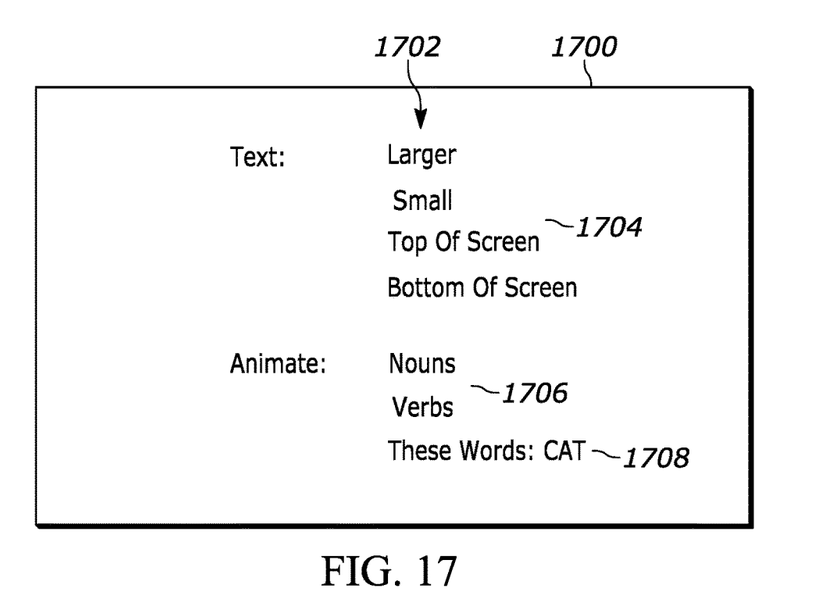

FIG. 17 illustrates that an end user can select a template to scale text, emphasize words to animate, and coordinate text to part of a video clip. With greater specificity, a display 1700 such as any display herein including, e.g., the display of the user apparatus on which a UI 1702 can be presented and can include an image of a game character either as provided by the game designer or as modified consistent with disclosure above to have the face of the user.

The UI 1702 can include text size selectors 1704 to enable a user to select the size and if desired location of text to be presented on the display during game play as typed in by the user or received from a friend. The UI 1702 also may include animation selectors 1706 to allow a user to define what text terms are to be animated or colored or otherwise highlighted during game play, including types of words and specific words themselves as defined by the user in a field 1708.

Machine learning may be used to put friends together, in which a game console can capture a video of the period of a game in which, for example, a trophy was won and share the video between friends on a friend's list of a user apparatus.

While the particular embodiments are herein shown and described in detail, it is to be understood that the subject matter which is encompassed by the present invention is limited only by the claims.

What is claimed is:

1. A device, comprising:
   circuitry configured to present on at least one display at least one computer game comprising at least a first character;
   present on the display at least a first selector selectable to select a length of a clip of the computer game in which the first character appears, the first character being modified according to an image of an end user.

2. The device of claim 1, wherein the first selector is selectable to:
   change native dialog of the computer game associated with the first character to use the end user's name or another name input by the end user; and
   create a digital image or video file based on at least part of the computer game.

3. The device of claim 1, wherein the first selector is selectable to:
   create .gif file based on at least part of the computer game.

4. The device of claim 1, wherein the first selector is selectable to:
   alter an age of the first character or hair of the first character or accessories of the first character or any combination thereof.

5. The device of claim 1, wherein the first selector is selectable to:
   alter a color of the first character.

6. The device of claim 1, wherein the first selector is selectable to:
   input voice signals representing the voice of the end user, the voice signals being used to alter native dialog of the computer game such that the dialog is played in the voice of the end user.

7. The device of claim 1, wherein the first selector is selectable to:
input dialog signals to create dialog of the computer game.

8. The device of claim 1, wherein the first selector is selectable to:
   input text presented with the computer game.

9. The device of claim 1, wherein the first selector is selectable to:
   identify text in the computer game as text to be animated.

10. The device of claim 1, wherein the first selector is selectable to:
    change native dialogue of the computer game associated with the first character to use the end user's name or another name input by the end user.

11. A method, comprising:
    presenting on at least one display at least one computer game comprising at least a first character, comprising:
       presenting, on the at least one display, a first selector; and
       receiving, through the first selector, a selection of a length of a clip of the computer game in which the first character appears, the first character being modified according to an image of an end user; and
    presenting, on the at least one display, at least one end user-generated alteration of an appearance or voice of the first character at least in part by changing native dialog of the computer game associated with the first character to use the end user's name.

12. The method of claim 11, comprising presenting, on the at least one display, at least one end user-generated alteration of an appearance of the first character.

13. The method of claim 11, comprising presenting on the display at least one end user-generated alteration of a voice of the first character.

14. A device comprising:
    circuitry configured to:
    execute a first app to fetch at least one computer game video from a server;
    present the computer game video on at least one display;
    scan a first code to execute a second app, which sends an image of a user to the server;
    fetch from the server an altered video that includes a character in the computer game video altered according to the image of the user;
    present on the display a second code;
    scan the second code to invoke a third app which is configured to enable sharing of at least a portion of the computer game video with at least one friend in a friend's list accessible to the circuitry.

15. The device of claim 14, wherein the circuitry comprises a mobile device.

16. The device of claim 14, wherein the third app is executable to present a scene from the computer game video along with a title of the computer game video.

17. The device of claim 14, wherein the third app is executable to present a share selector selectable to cause a user interface (UI) to be presented, the UI comprising a prompt to check out a video under which is at least one selector selectable to select a friend to share at least a portion of the computer game video.

18. The device of claim 14, wherein the second app sends input voice signals representing the voice of an end user, the voice signals being used to alternative dialog of the computer game such that the dialog is played in the voice of the end user.

* * * * *

UNITED STATES PATENT AND TRADEMARK OFFICE
CERTIFICATE OF CORRECTION

PATENT NO. : 12,370,454 B2  
APPLICATION NO. : 18/624926  
DATED : July 29, 2025  
INVENTOR(S) : Ken Yoshihiko Hirakawa et al.

Page 1 of 1

It is certified that error appears in the above-identified patent and that said Letters Patent is hereby corrected as shown below:

In the Claims

Column 9, Lines 33-35, Claim 1, please delete "present on at least one display at least one computer game comprising at least a first character" and insert same at Column 9, Line 34 as new subpoint.

Signed and Sealed this  
Thirtieth Day of September, 2025

John A. Squires  
*Director of the United States Patent and Trademark Office*